United States Patent [19]

Bolt et al.

[11] 3,735,108

[45] May 22, 1973

[54] CODED DECIMAL NON-RESTORING DIVIDER

[75] Inventors: Durk Jan Bolt; Jogchum Reitsma, Beekbergen, Netherlands

[73] Assignee: U.S. Philips Corporation, New York, N.Y.

[22] Filed: Jan. 26, 1972

[21] Appl. No.: 220,980

[30] Foreign Application Priority Data

Jan. 30, 1971 Netherlands ........................7101257

[52] U.S. Cl. ..................................................235/159

[51] Int. Cl. ..................................................G06f 7/52

[58] Field of Search...............................235/159, 160

[56] References Cited

UNITED STATES PATENTS

| | | | |
|---|---|---|---|
| 3,031,139 | 4/1962 | Spingies et al. | 235/160 |
| 3,308,281 | 3/1967 | Crowther et al. | 235/160 |
| 3,330,946 | 7/1967 | Scuitto | 235/160 |
| 3,644,724 | 2/1972 | Angelov et al. | 235/159 |

OTHER PUBLICATIONS

I. Flores, The Logic of Computer Arithmetic, 1963 pp. 249–253.

*Primary Examiner*—Malcolm A. Morrison
*Assistant Examiner*—David H. Malzahn
*Attorney*—Frank R. Trifari

[57] ABSTRACT

A calculating device for dividing decimal numbers according to the method of division without restoration of the remainder, in which the dividend tetrade register comprises an additional tetrade in the location whose order is one higher than the location of the dividend digit of the highest order, and in which a 0 is stored prior to the start of a division. The divisor tetrade register comprises an additional tetrade in the location of the highest order which is a 0, a digit 9 being permanently stored in the latter additional tetrade. In a calculating unit the contents of said additional tetrades are normally included in the subtract and add operations. The correct quotient digits are then automatically produced, said digits being stored, in reaction to a shift command, in the quotient tetrade register each time that the dividend or remainder passes through 0. The shift command, moreover, ensures that the remainder is shifted into the dividend tetrade register in a location of the next higher order.

1 Claim, 4 Drawing Figures

CODED DECIMAL NON-RESTORING DIVIDER

Figure 1:
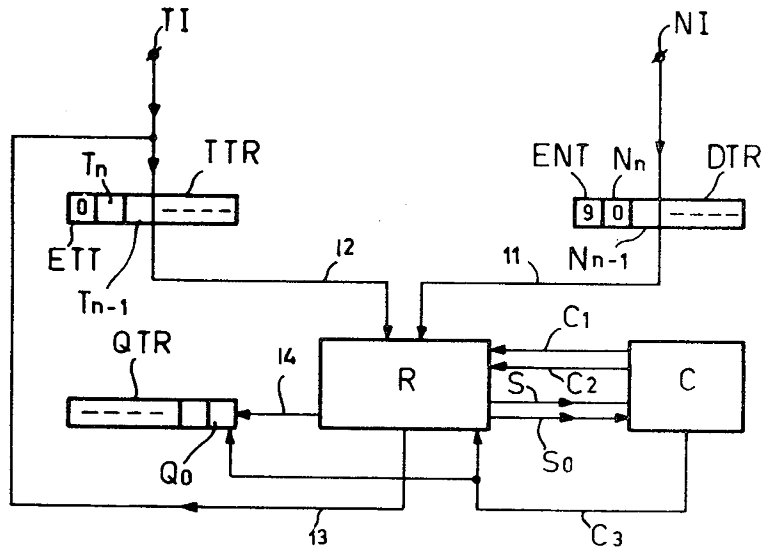

The invention relates to a calculating device for dividing decimal numbers according to the method of division without restoration of the remainder. The device comprises a divisor tetrade register for storing the divisor digits, the divisor digit of the highest order being a 0, a dividend tetrade register is provided for storing the dividend digits and, after a subtraction or an addition of the divisor, for storing the remainder digits. A quotient tetrade register for storing the quotient digits. A calculating unit is provided together with a control unit which supplies, if the dividend or a remainder is positive, a command to the calculating unit for performing a subtraction of the contents of the divisor tetrade register from the contents of the dividend tetrade register, and a command for performing an addition of the contents of the divisor tetrade register to the contents of the dividend tetrade register, if a remainder is negative. The control unit supplies a shift command, in reaction to a condition signal generated during the processing in the calculating unit, for shifting the remainder into a tetrade of the next higher order in the dividend tetrade register, and for shifting the quotient into a tetrade of the next higher order in the quotient tetrade register.

Calculating devices of this kind for dividing decimal members are generally known. One of the problems inherent to the known devices, is still the accurate formation of each new quotient digit. For subtraction, special steps are required to ensure that, when the remainder passes through zero, a quotient digit formed is reduced by one. For example, in order to find the correct quotient digit upon addition, counting down is to be started at the number 10 which covers two digit tetrades.

The invention has for its object to provide a considerable simplification of the process, and hence, of the calculating device for the automatic determination of the correct quotient digits, both in the case that the divisor is added to the remainder, and in the case that the divisor is subtracted from the remainder. To this end, the calculating device for dividing decimal numbers according to the method of division without restoration of the remainder is characterized in that the divisor tetrade register comprises an additional tetrade in the location whose order is higher by one than the location of the divisor digit (0) of the highest order. A digit 9 is permanently stored in the said additional tetrade, and the dividend tetrade register comprises an additional tetrade in the location whose order is one higher than the location of the dividend (remainder) digit of the highest order. A digit 0 is stored in the latter additional tetrade at the start of a division, the correct quotient digit is automatically produced by the add and subtract operations in the calculating unit. The contents of said additional tetrades are also involved in said operations, the said quotient digit being shifted into the location of the lowest order of the quotient tetrade register in reaction to said shift command.

As the contents of said additional tetrades are normally involved in the process of addition and subtraction, the desired quotient digits are automatically produced in succession without any additional steps being necessary. It is readily possible to shift these quotient digits into the quotient tetrade register by means of shift commands from the calculating unit.

Figure 2:
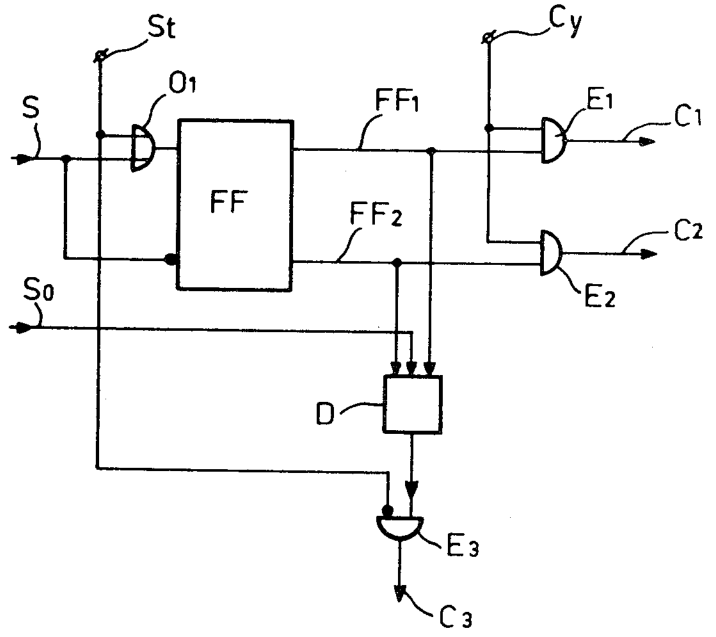

In order that the invention may be readily carried into effect, one embodiment thereof will now be described in detail, by way of example, with reference to the accompanying diagrammatic drawings, in which:

FIG. 1 shows a diagram of an embodiment of a calculating device according to the invention, FIG. 2 shows a possible solution for the control system of the device shown in FIG. 1, and FIGS. *3a* and *3b* show calculating examples using the device according to the invention.

In FIG. 1 the letters DTR denote a divisor tetrade register having an input NI, and an output via a line 11. The dividend tetrade register is denoted by TTR and has an input TI and an input via line 13 and an output via line 12. It is to be emphasized that it is irrelevant for the invention whether the numbers are processed, and/or transported, in parallel or in series form. If transport is effected in series form, the said inputs TI and NI, and the lines 11, 12 and 13, may be single. If transport is effected in parallel form, Ni, TI, 11, 12, 13 each represent a collection of inputs and lines, respectively.

Furthermore, R denotes a decimal calculating unit, C denotes a control unit, and the letters QTR denote a quotient tetrade register. C2 is a command line for add commands, C1 for subtract commands and C3 for shift commands. Line 14 serves for transporting the successively produced correct quotient digits from the calculating unit R, to the quotient tetrade register QTR. According to the invention, the divisor tetrade register DTR comprises, in the location whose order is one higher than the divisor digit of the highest order, an additional tetrade ENT in which a digit 9 is permanently stored. The divisor digit of the highest order, present in the tetrade N*n*, is the digit 0. Similarly, the dividend tetrade register TTR comprises an additional tetrade ETT in the location whose order is one higher than the location of the dividend digit of the highest order, a digit 0 being stored in the latter additional tetrade when the division of two numbers commences.

Furthermore, a line S is provided for conditional signals via which the calculating unit R informs the device C, whether the remainder is above or below 0. A line So is provided for informing C whether the remainder is equal to zero. The operation is as follows: prior to the division, the dividend is shifted into the dividend tetrade register TTR, and the divisor is shifted into the divisor tetrade register. The signs of the dividend and the divisor are processed according to known techniques, so as to determine the sign of the quotient; as this processing does not form part of the invention, it will not be elaborated upon in this context. The division starts upon a subtract command on line C1; as a result, the contents of register DTR i.e. the divisor, preceded by a digit 9) are subtracted in the calculating unit R from the contents of register TTR (i.e. the dividend, preceded by a digit 0). If no passage through 0 occurs, the remainder is inserted directly into register TTR again. The digit 9 in the additional tetrade ENT has thus been subtracted from the contents 0 of the additional tetrade ETT. The result is a digit 1 in the additional tetrade ETT. The subtract operations succeed each other, the contents of the tetrade ETT being equal to the number of subtract operations. However, if the remainder passes through 0 during a subtract operation, a "one" is borrowed from the additional tetrade ETT, so that the subtraction of the 9 (present in ENT) from the contents of ETT, means that exactly the correct quotient digit value is produced (see also the examples of FIG. 3). In FIG. 1, the passage through 0 of the remainder is signalled to the control unit C via the condition signalling line S. The passage through 0 of the remainder can be signalled in various manners, depending on the construction of the calculating unit.

If in this case the remainder were to pass through 0 from positive to negative, a digit 9 would definitely appear in location T*n* of the register TTR. The appearance of that digit 9, may serve, for example, for giving the said signalling. The signal via line S to the control unit indicating that the remainder passes through 0, causes a shift common from the control unit via C3, and the result of the last subtraction is thus shifted over one location (in FIG. 1 to the left) in the dividend tetrade register TTR. This means, that in that case, the digit 9 appears in tetrade ETT instead of in tetrade T*n*. The digit value previously present in ETT, which has remained the same during this subtract operation, and which represents the correct quotient digit, is received via line 14 in the quotient tetrade register QTR. The digit is received in this register in the location Q0 of the lowest order, which has just been vacated by a command via line C3, which shifted the contents of QTR over one location (in FIG. 1 to the left).

Subsequently, the control unit C starts to apply add commands to the calculating unit R *via* line C2. The contents of the register DTR are then added to the contents of register TTR. This means that the 9 in the additional tetrade ENT, and the 9 which is now present in the additional tetrade ETT, are added during the first add operation. In this way, the addition is started such, that upon a subsequent passage through 0 of the remainder, after one or more operations, the correct quotient digit is formed again (see examples FIG. 3). The passage through 0 of the remainder, from negative to positive, is again signalled. Now a digit 0 would appear in the location T*n* of register TTR, which fact may be used, for example, for giving the said signalling. The signalling via condition signalling line S, to the control unit C, that the remainder passes through 0, causes a shift command via line C3, and thereby the result of the last addition is shifted over one location (in FIG. 1 to the left) in the dividend tetrade register TTR. This means, that now the said 0 appears in tetrade ETT instead of in tetrade T*n*. The contents of ETT are thus removed again, and this value, being the correct quotient digit, is received again in tetrade Q0 of register QTR as the shift command on line C3 has again shifted the contents of Q0 over one location (in FIG. 1 to the left). After that, subtraction may take place again, etc.

FIG. 2 shows a detail of the control unit C of FIG. 1. This is an example of a possible solution for a control system. The letters FF denote a flip-flop D is a pulse source. E1, E2, E3 are AND-function gates, and 01 is an OR-function gate. Assume that a start signal is given via St at the start of a division. Via OR-function gate 01, the flip-flop FF is set therewith, and a 1-signal appears on output FF1. When a calculating unit cycle start signal appears on Cy, the 1-signal on FF1 is applied to line C1 via AND-function gate E1. This means a subtract command for the calculating unit R. IF the dividend or the remainder remains positive when this subtract command is executed, i.e. no passage through 0 takes place, a 1-signal appears on line S in this example. In that case the situation is not changed. When a next 1-signal appears on Cy, another subtraction is performed. If the remainder passes through 0, i.e. it becomes negative, there is, or there will be, a 0 -signal on line S in this example. The inverse value of the signal on line S (indicated by a dot in the FIG. 2) is applied to the reset input of the flip-flop FF, and therefore this flip-flop is reset: now FF2 carries a 1-signal. The change in the state of FF2 causes a pulse source (differentiating element) D to supply a pulse via AND-function gate E3 which, if it has not been produced in the start situation, serves as a shift command on line C3. By means of AND-function gate E3, a shift command will not arise directly when a start command appears on line S*t*. To this end, the inverted value (dot on AND-function gate E3) of the signal on St is applied to E3. The pulse source D comprises a differentiating element such that the input signals are differentiated. These input signals are received as if they arrived via an OR-function gate, so that each signal is individually differentiated. The 1-signal on FF2 provides add operations each time that a calculating unit cycle signal appears on C*y*. If the remainder passes through 0 again, the subtraction situation described before reoccurs, after a shift command has first been given via line C3. Finally, if the remainder becomes 0, this is signalled via line S0. This also causes a shift command via pulse source D, so that the last quotient digit formed is also stored in the quotient tetrade register. In addition, the dividing device can be completely cleared by means of the signal on S0. If the remainder cannot become 0, or if a division is to be interrupted prematurely (if, for example, only a predetermined number of digits behind the decimal point is reached), steps can of course be taken to this end. These steps, however, are irrelevant in this context.

Figure 3A:
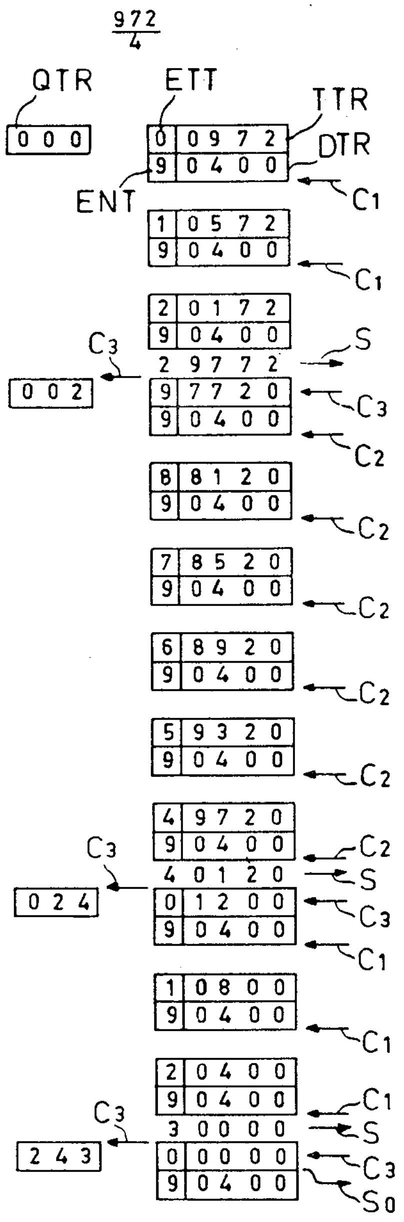
Figure 3B:
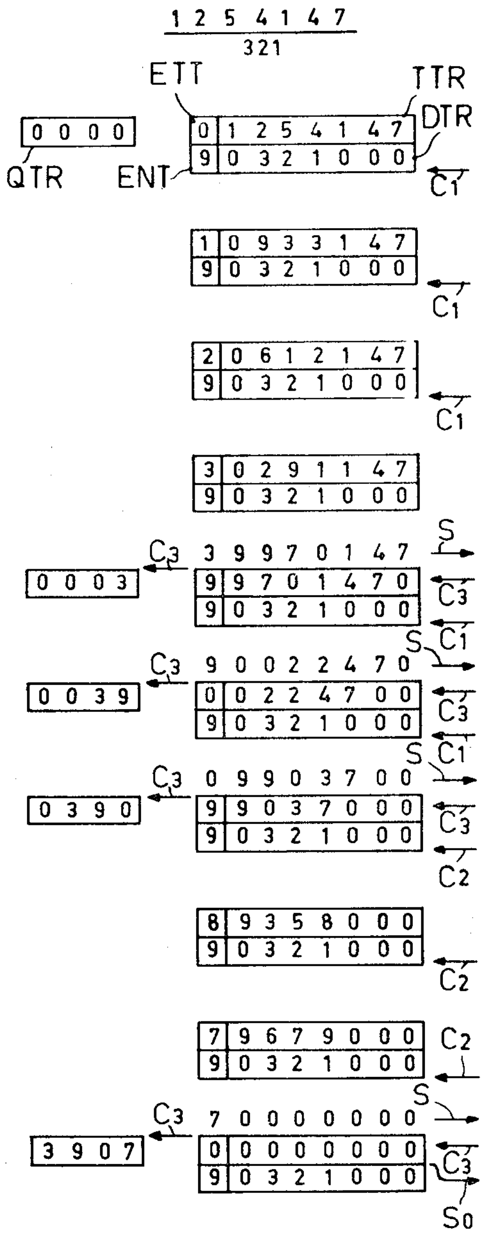

FIGS. 3*a* and 3*b* show examples of divisions performed in a device according to the invention. The successive contents of the registers TTR, DTR and QTR are shown. The commands and signals present in the various situations are denoted by the respective command line and signal line indications: C1, C2, C3, S, S0. The examples are self-explanatory.

What is claimed is:

1. A calculating device for dividing a decimal number according to a method of division which does not restore a remainder, said calculating device comprising a divisor tetrade register for storing divisor digits, a divisor digit of the highest order being a 0, a dividend tetrade register for storing dividend digits and, after a subtraction or an addition of a divisor, for storing remainder digits, a quotient tetrade register for storing quotient digits, and furthermore comprising a calculating unit respectively connected to said registers and a control unit connected to said calculating unit which supplies, if a dividend or a remainder is positive, a command to the calculating unit for performing a subtraction of divisor tetrade register contents from dividend tetrade register contents, and a command for performing an addition of the contents of the divisor tetrade register to the contents of the dividend tetrade register, if a remainder is negative, the control unit supplying a shift command, in reaction to a condition signal generated during the processing in the calculating unit, for shifting the remainder into a tetrade of the next higher order in the dividend tetrade register, and for shifting a quotient into a tetrade of the next higher order in the quotient tetrade register, the divisor tetrade register further comprising an additional tetrade in a location whose order is higher by one than a location of the divisor digit (0) of a highest order, a digit 9 being permanently stored in said additional tetrade, the dividend tetrade register comprising an additional tetrade in a location whose order is one higher than a location of the dividend (remainder) digit of a highest order, a digit 0 being stored in the latter additional tetrade at the start of a division, the correct quotient digit being automatically produced by the add and subtract operations in the calculating unit, the contents of said additional tetrades also being involved in said operations, said quotient digit being shifted into a location of a lowest order of the quotient tetrade register in reaction in said shift command.

* * * * *

PO-1050
(5/69)

UNITED STATES PATENT OFFICE
CERTIFICATE OF CORRECTION

Patent No. 3735108 Dated May 22, 1973

Inventor(s) DURK JAN BOLT and JOGCHUM REITSMA

It is certified that error appears in the above-identified patent and that said Letters Patent are hereby corrected as shown below:

ABSTRACT, line 9, after "location" insert --whose order is one higher than the location of the divisor digit--

Column 1, line 7,",a" should be --.A--
line 10, after "register" insert --is provided--

Column 2, line 38, "conditional" should be --condition--
line 51, before "i.e." insert --(--

Column 3, line 11, "common" should be --command--.

Signed and sealed this 26th day of February 1974.

(SEAL)
Attest:

EDWARD M.FLETCHER,JR.
Attesting Officer

C. MARSHALL DANN
Commissioner of Patents